July 11, 1933.                C. H. MARSHALL                1,917,659
                              ENDLESS CONVEYER
                        Filed July 8, 1931        2 Sheets-Sheet 1

Inventor,
Charles H. Marshall.
W. H. Lockwood
Attorney.

July 11, 1933.  C. H. MARSHALL  1,917,659
ENDLESS CONVEYER
Filed July 8, 1931  2 Sheets-Sheet 2
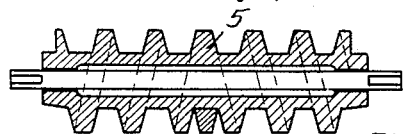
FIG. 3
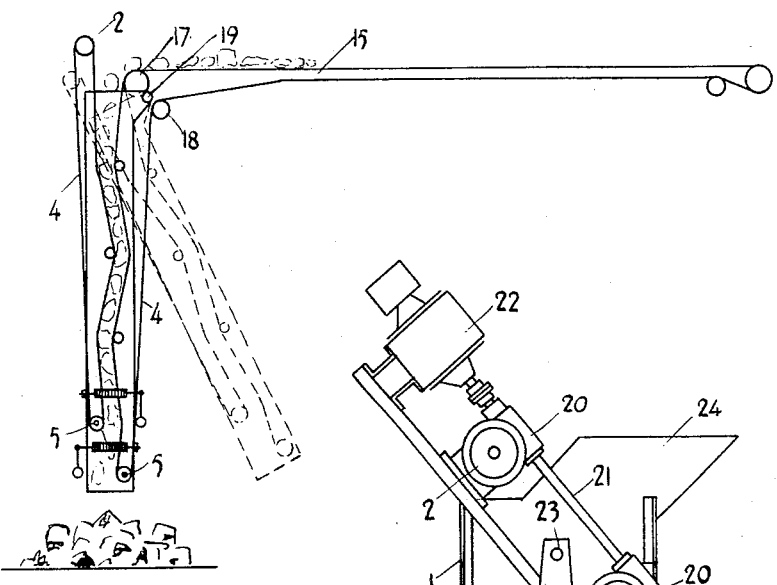
FIG. 4
FIG. 5
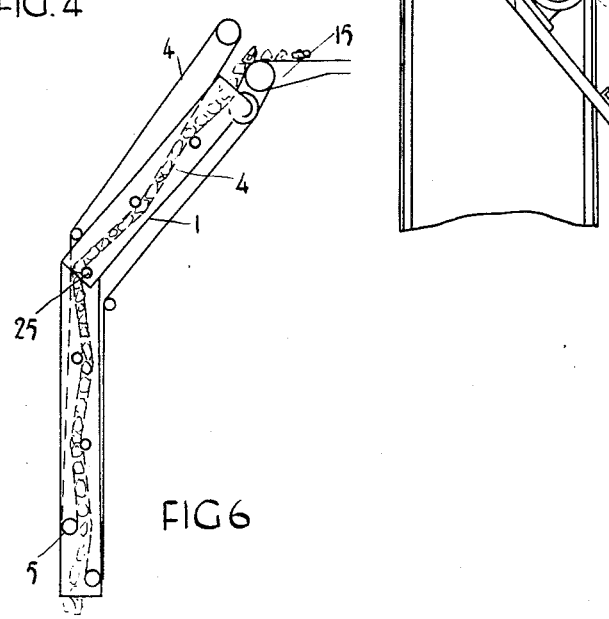
FIG 6
Inventor
Charles H. Marshall
N. H. Lockwood
Attorney.

Patented July 11, 1933

1,917,659

UNITED STATES PATENT OFFICE

CHARLES HERBERT MARSHALL, OF ERITH, KENT, ENGLAND

ENDLESS CONVEYER

Application filed July 8, 1931, Serial No. 549,477, and in Great Britain July 8, 1930.

This invention relates to endless conveyers, its object being to provide a conveyer adapted to act as an anti-breakage device for lowering the material which is being conveyed, into the hold of a ship, for example, or to some other point at a lower level than that at which the material is supplied to the conveyer. Such an anti-breakage device is particularly suited where the material being handled is delivered continuously by a second conveyer to the conveyer which does the lowering.

According to the present invention, a conveyer device adapted to act as an anti-breakage device comprises a pair of superposed endless conveyer belts, the adjacent faces of which travel in the same direction. The material to be handled is fed between these superposed faces and is carried along by them, and can thus be lowered at any desired speed to the delivery point. The belts run over guides or idler pulleys, and it is desirable to stagger them, so that the belts acquire a zig-zag form, as this assists in giving the belts sufficiently firm grip on the material being handled.

Figure 1:
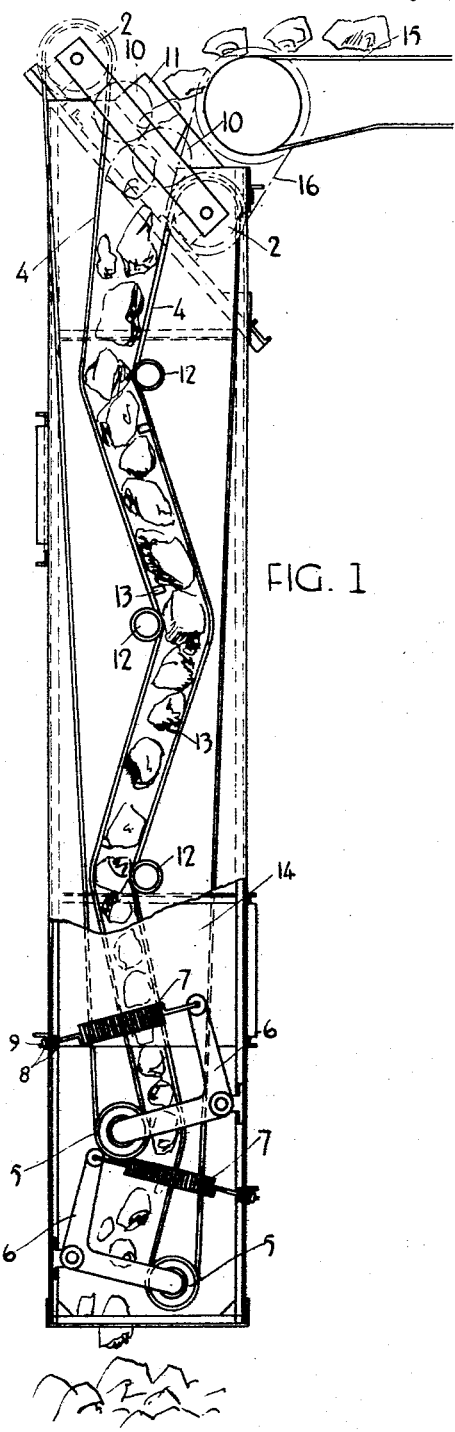
Figure 2:
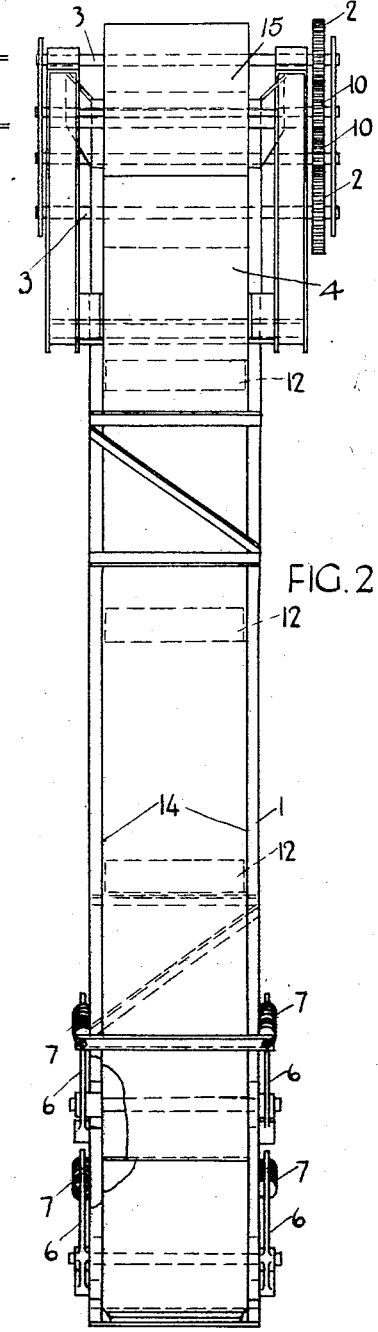

The invention will now be described, by way of example, with reference to the accompanying drawings, of which Figure 1 is a side elevation in part section of a conveyer for lowering material and adapted to act as an anti-breakage device, Figure 2 is an end elevation looking in direction A of Figure 1, Figure 3 is a section of one of the belt tail pulleys, Figures 4 and 6 are diagrammatic views of modified forms of conveyer and Figure 5 shows an alternative form of driving means for the conveyor shown in Figure 1.

With reference to the drawings and more particularly to Figures 1, 2 and 3 thereof, the conveyer comprises a vertical steel framework 1 at the upper end of which are mounted a pair of pulleys 2 having their axes 3 parallel. Over each of these pulleys 2 passes a conveyer belt 4, which, at its lower end, passes over a tail pulley 5 mounted on bell cranks 6 which are acted on by springs 7 and which serve to maintain the tension in the belt by taking up the varying amount of slack therein. Each spring 7 is secured to the framework by means of two nuts 8 on a threaded portion 9 of the spring, so that by moving the two nuts 8 along the portion 9, the tension of the springs 7 may be readily adjusted. The pulleys 2 are geared together by a train of spur wheels 10 so that the two belts 4 run at the same speed. The belts are so driven that the adjacent faces move in the same direction, viz, downwards, so that any material fed into the space between the adjacent faces is carried downwards in a controlled and smooth manner. The incoming material is directed between the adjacent faces by means of guide plates 11.

Between the head and the tail pulleys are mounted a number of idler pulleys 12 which act as guides for the belts 4, and these idlers are staggered, so that the belts travel along a zig-zag path. In this way the grip of the belts on the material between them is enhanced. In addition, transverse slats 13 may be mounted on the belts when handling mixed material of large and small sizes, so as to prevent material of small size falling between the belts. The slats may conveniently be made of wood or of mild steel angles. Furthermore, the bell cranks 6 are so arranged that the spring 7 tend to rotate the bell cranks carrying the respective pulleys 5 in opposite directions so that the pulleys tend to move inwards and thereby to press the two belts against the material between them.

Arranged on each side of the belts 4 and secured to the framework 1 are thin side plates 14, which serve to prevent lateral escape of the material. Each pulley 5 is provided with a right and a left hand thread (as shown in Figure 3), so that any material that works its way round the edge of a belt to the inside thereof, falls on a pulley 5 and is outwardly ejected by the thread.

The conveyer is shown as being fed from a transverse conveyer 15, which also drives one of the pulleys 2 by means of a chain drive 16. The belt of the transverse conveyer 15 is shown as wider than the belts 4 of the lowering conveyer, and the belts 4 are therefore driven at a higher speed than the belt of the conveyer 15 in order to ensure an even flow of material. The lowering conveyer may conveniently be pivoted about the axis 3 of the pulley 2 driven by the driving chain 16, so that the conveyer may readily be slewed for trimming. In order to give further flexibility to the conveyer, the framework may be made in two parts which are pivoted together, as shown in Figure 6, the pivot being at 25.

In Figure 4 the belt of the transverse conveyer 15 is extended to form one of the belts 4 of the lowering conveyer and passes over pulleys 17 and 18, which are fixed relatively to the transverse conveyer 15, and around a tail pulley 5 of the lowering conveyer. The lowering conveyer is pivoted at 19 and is shown in broken line in its slewed position.

In Figure 5 is shown an arrangement for driving the lowering conveyer independently of a transverse conveyer. The pulleys 2 are driven through worm gearing 20 by means of a shaft 21, which is driven by an electric motor 22 mounted on the framework 1. The conveyer is pivoted at 23 and is provided with a hopper 24 for feeding material to the conveyer belts.

I claim:—

1. A conveyer device for lowering material comprising a downwardly-extending framework, a pair of endless conveyer belts passing down the framework with faces opposite and adjacent to one another, a pair of pulleys mounted at the lower end of the framework and around which the respective belts pass, each of said pulleys being provided with a deep screw thread in which material escaping around the edge of the associated belt is accommodated without being compressed between the belt and the surface of the pulley until finally outwardly ejected by the thread.

2. A conveyer chute for lowering material such as coal comprising a pair of downwardly extending endless conveyer belts arranged with faces opposite and adjacent to one another, means for driving said belts so that the adjacent faces thereof move together in the downward direction to convey the material between them, downwardly extending side plates arranged on opposite sides of the belts with their faces in close proximity to the edges of said belts so that the opposite faces of the belts and the opposite faces of the side plates form an enclosed chute down which the material is lowered, a plurality of idler pulleys mounted in spaced relation between said side plates for engaging the belts and causing them to travel in a zig-zag path, pulleys at the lower end of the chute around which the belts pass and spring biased members on which said end pulleys are mounted, the arrangement being such that as material passes between the belts movement of the opposite faces thereof away from one another to increase the cross sectional area of the enclosed chute is permitted by movement of said spring biased members against the bias of the springs.

3. A conveyer chute for lowering material such as coal comprising a downwardly extending framework, a pair of endless conveyer belts extending down the framework with faces opposite and adjacent to one another, a pair of sideplates supported by said framework and arranged adjacent to the edges of the belts to prevent lateral escape of material from between the belts, a plurality of idler pulleys mounted on the framework to direct the belts in a zig-zag path, a pair of end pulleys within the framework around which the respective belts pass, arms pivoted to the framework for carrying the end pulleys, the arms for the respective pulleys being pivoted on opposite sides of the framework so as to extend transversely of the meeting faces of the belts, and springs for moving said arms and the associated pulleys to tension the belts and draw the opposite faces together, the arrangement being such that under the action of said springs the belts may move apart to accommodate the passage of material varying in size therebetween while the belts maintain a constant pressure thereon.

4. A conveyer chute as in claim 3 wherein said belts are supported on driving pulleys at the upper end of said framework, said driving pulleys being spaced apart to permit the entrance of material between the belts and means for rotating the driving pulleys so as to move the belts in unison.

CHARLES HERBERT MARSHALL.